INVENTOR.
JOHN PILECKIS
BY
ATTORNEY.

Dec. 12, 1972   J. PILECKIS   3,705,990
THYRISTOR FIRING CONTROL CIRCUIT

Filed July 21, 1971   2 Sheets-Sheet 2

INVENTOR.
JOHN PILECKIS

BY Osmund R. Dahle
ATTORNEY.

United States Patent Office 3,705,990
Patented Dec. 12, 1972

3,705,990
THYRISTOR FIRING CONTROL CIRCUIT
John Pilckis, Shaumburg, Ill., assignor to Honeywell Inc., Minneapolis, Minn.
Filed July 21, 1971, Ser. No. 164,720
Int. Cl. H03k 17/56
U.S. Cl. 307—252 B
5 Claims

ABSTRACT OF THE DISCLOSURE

A burst firing type of solid state modulating condition control system operating a solid state power handling semiconductor means. A programmable unijunction transistor is utilized to provide a modified zero crossover firing circuit with an extended triggering pulse to the Triac when using inductive loads or in three phase control circuits where control circuit voltage and load circuit current are not in phase.

BACKGROUND AND SUMMARY OF THE INVENTION

The present invention is an improvement to the Pinckaers Patent 3,443,124 which is assigned to the same assignee as the present invention. That patent is broadly directed to a solid state modulating condition responsive circuit that has a substantially proportional output to control the conduction of a power handling semiconductor switch of the type normally referred to as an SCR, Triac or thyristor. More specifically, it is disclosed a burst firing type of control circuit including a sawtooth generator for providing a repetitive type of cycle for the device, and combined therewith is a condition responsive circuit that has an electrical output varying in magnitude in response to a sensed condition, these signals being mixed to control a switching circuit. Further, a synchronizing signal disables the switching circuit except at a very brief interval at each zero-voltage phase condition to provide a zero phase firing circuit.

When the power factor of the load being controlled is near unity, such as with a resistive load in a single phase circuit, the above-described invention operates completely satisfactorily; however, there are occasions when an inductive load causes a lagging power factor or when using a polyphase system in which the load current is not necessaily in phase with an applied voltage, such that it becomes necessary to extend the length of the triggering pulse to the Triac so that both the zero voltage crossover and the zero current crossover are covered by the triggering pulse. The present invention provides an improved circuit therefor, for use in control systems where the load current flowing through the Triac is not in phase with the applied voltage and where an extended triggering pulse is therefore required.

Figure 1:
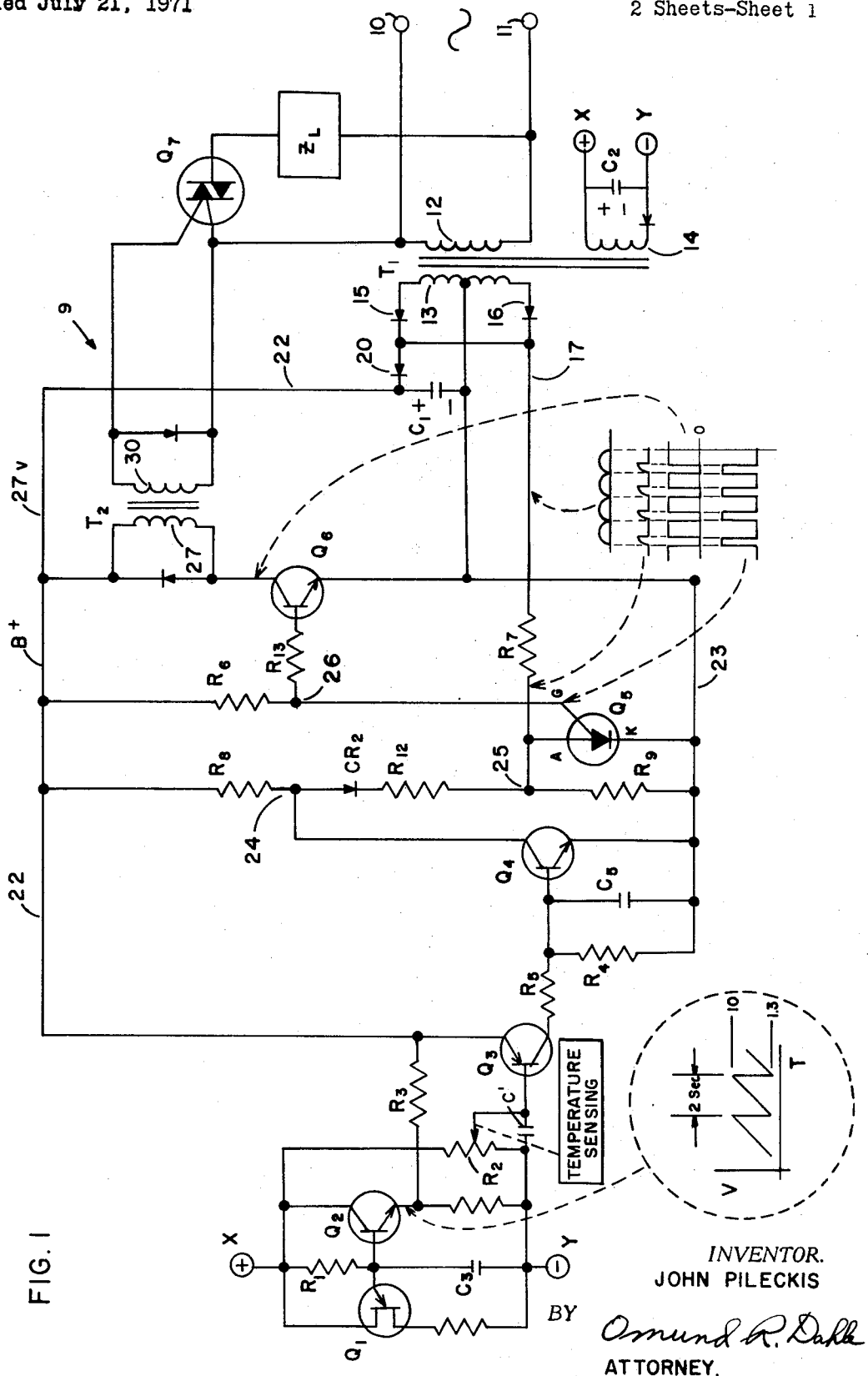

FIG. 1 of the drawing discloses a schematic circuit of a preferred embodiment of the control circuit of the invention, and FIGS. 2 to 5 disclose 3-phase systems and voltage-current phase diagrams thereof, which systems have lagging current and require an extended firing phase such as provided by the circuit of FIG. 1.

Referring now to the drawing in FIG. 1 there is shown a control circuit 9 having a pair of power input terminals 10 and 11 adapted to be energized from a suitable source of alternating current power. These terminals energize the primary winding 12 of a power transformer T1, which transformer also includes secondary windings 13 and 14. Rectifiers 15 and 16 provide full wave rectified unfiltered pulses on a conductor 17 and in combination with additional diode 20 and filter capacitor C1 provide a positive DC voltage or B+ on conductor 22. The alternating potential at winding 14 is also rectified and filtered to provide a separate DC power supply at terminals X and Y. This power supply energizes a conventional relaxation oscillator comprising unijunction transistor Q1, a resistor R1 and a capacitor C3, the sawtooth output wave form therefrom being coupled through a transistor Q2. Also connected across the XY terminals is an external mechanically driven potentiometer R2 controlled by a separate temperature sensing circuit. A ramp filter capacitor, C1 is connected from base of Q3 to conductor Y.

The adjustable wiper of R2 is connected to the base electrode of a further comparator transistor Q3 and the sawtooth or ramp output of the sawtooth generator is connected through a resistor R3 to the emitter of transistor Q3. The B+ conductor 22 is also connected to the emitter electrode of Q3 and the collector thereof is connected through a resistor R5 and the base-emitter circuit of transistor Q4 to the negative conductor 23. Also connected from the resistor R5 to the negative conductor is a capacitor C5 paralleled by a resistor R4.

A voltage divider is connected across the B+ supply and may be traced through a resistor R8, a diode CR2, a resistor R12, and a resistor R9 to the conductor 23. A node 24 between R8 and CR2 is directly connected to the collector electrode of Q4. A node 25 between R12 and R9 is connected to the anode of a programmable unijunction transistor (PUT) Q5, the cathode of which is connected to conductor 23. The full wave rectified DC pulses on conductor 17 are also connected to the anode of the PUT through a resistor R7.

Another circuit from conductor 22 may be traced through the primary winding 27 of a transformer T2, through the collector-emitter circuit of a transistor Q6 to the negative conductor 23. A bias circuit for this transistor may be traced from the base electrode through a resistor R13, a node 26, and a resistor R6 to the B+ conductor 22. The bias circuit is normally conductive for pulse output and establishes a voltage reference level at node 26. The node 26 is directly connected to the gate electrode of the PUT Q5. The secondary winding 30 of transformer T2 is connected to the control circuit of a thyristor or Triac Q7, the output circuit of the Triac connecting a load $Z_L$ across the power input terminals 10 and 11.

Figure 3:
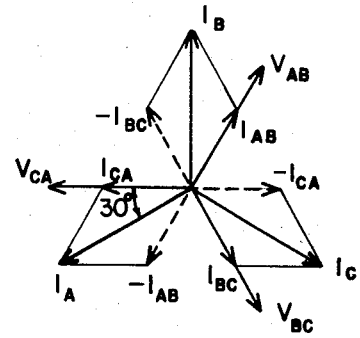
Figure 4:
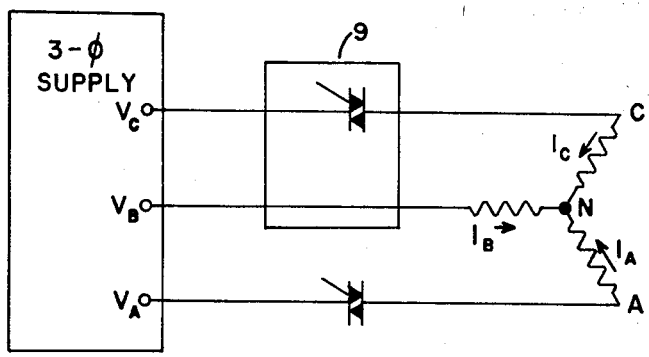
Figure 5:
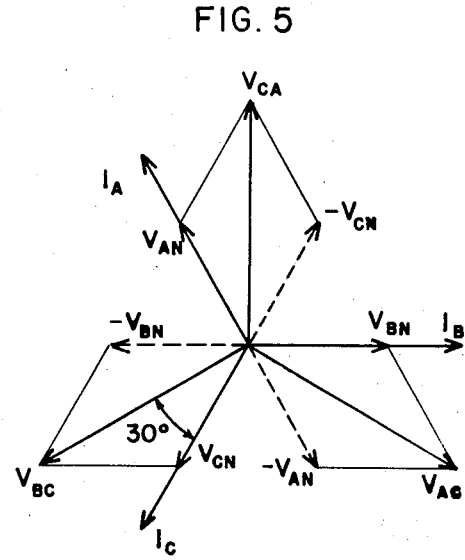

In considering the operation of this apparatus it may be considered as a burst firing circuit in which effective modulation is obtained by varying the ratio of the number of conductive cycles in the burst to the off cycles. The controller is especially adapted for use in a three phase Y connected supply system such as shown in FIGS. 2 and 4 where the current lags the voltage as represented by the phase diagrams in FIGS. 3 and 5, so that it is necessary to fire Q7 beginning with the zero point in the current wave form, which necessitates utilizing a gating pulse to the Triac of sufficient duration to encompass both the zero voltage crossover and the zero current crossover signal at the Triac.

The sawtooth generator Q1 may be designed to have a sawtooth waveform repetition rate of about two seconds. It can be seen that the transistor Q3 operates as a comparator to determine when the sawtooth ramp voltage exceeds the voltage at the wiper R2. The position of the wiper and consequently the voltage is determined by the external sensing circuit. During the portion of the sawtooth ramp which exceeds the voltage at the potentiometer wiper transistor Q3 is caused to conduct, thereby also rendering transistor Q4 conductive so that voltage at note 24 is dropped substantially to the potential of negative conductor 23 thus removing holding current from anode of Q5. The voltage seen at the aode of programmable unijunction Q5 during this portion of the ramp will be rising sine wave from conductor 17. This means that Q5 will extinguish each half cycle as the applied voltage drops to zero (due to lack of holding current) and will reignite when the potential at the anode exceeds the potential at the gate as determined by the voltage divider R6, R13 and through B-E junction of Q6. When transistor Q5 fires, the junction 26 is effectively shorted to negative conductor 23 thus turning off the output transistor Q6. As Q6 is turned off, the triggering pulse to Triac Q7 is terminated. Thus it may be seen that at the end of each voltage half cycle, as Q5 is extinguished, the transistor Q6 turns on to initiate the trigger signal to the Triac and that this pulse is of sufficient duration to encompass the zero crossover of the voltage as well as the zero crossover of the lagging current through $Z_L$.

Let us now consider the beginning portion of the sawtooth wave form as capacitor C3 is just beginning to charge and the comparator transistor Q3 as well as transistor Q4 is off. The potential seen at the transistor Q5 anode now is near that of negative conductor 23 because of holding current flowing from positive conductor 22. This holding current prevents the voltage at the Q5 anode from rising as described above and Q5 remains conductive throughout the entire period that the comparator Q3 is off. If it is assumed that the comparator Q3 is off for that second when the ramp voltage is low and then is on for one second of the two second repetition time, it is seen that the unijunction Q5 is likewise on continuously for that former second thus shorting out and removing the turn on bias from transistor Q6 so that no triggering pulse is applied to Triac Q7 during that interval.

Figure 2:
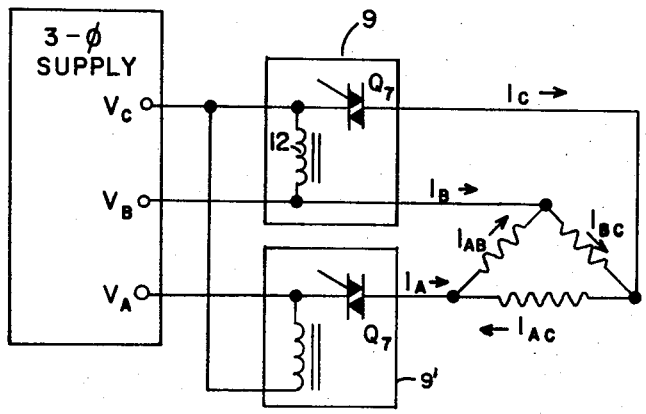

FIG. 2 shows a three wire three phase supply $V_A$, $V_B$, $V_C$ connected to a delta connected load with the control system 9 of FIG. 1 shown in block diagram from and controlling the current to the load on line $V_C$. The controller 9' controlling the current in line $V_A$ may be similar to controller 9 and is slaved to controller 9. The phase diagram of FIG. 3 shows the voltage current relationship of 3 phase circuit and it may be seen in FIG. 3 that the currents $I_C$, $I_A$ and $I_B$ in lines $V_C$, $V_A$ and $V_B$ lag the voltage $V_{BC}$, $V_{CA}$ and $V_{AB}$ by 30° in such a system. Similarly FIG. 4 shows a three-wire three-phase supply connected to a Y connected load. The phase diagram of FIG. 5 relates the system of FIG. 4. In each of these situations since line current is lagging line voltage, it is necessary to provide a pulse long enough to retrigger the Triac at the zero current crossover.

The embodiments of the invention in which an exclusive property or right is claimed are defined as follows:

1. In a control circuit for controlling an applied alternating current flow through power handling semiconductor switch means in response to a condition, a circuit comprising:

normally conductive firing circuit means for providing a triggering signal to a power handling semiconductor switch means, said firing circuit means having means for establishing a first voltage level;

firing circuit disabling means comprising a programmable unijunction transistor having anode, cathode and gate electrodes wherein said gate is connected to said voltage level and is thereby effective to disable said firing circuit means whenever said programmable unijunction transistor is conductive;

means for supplying a pulsating voltage, synchronized to said applied alternating current, to the anode-cathode circuit, said pulsating voltage cyclically exceeding said first voltage level to turn on said programmable unijunction transistor and dropping to a minimum voltage level allowing said unijunction transistor to turn off;

a holding current supply means;

and control means including a condition sensing circuit for controlling the application of the holding current to said anode-cathode circuit so as to prevent turn off of said unijunction transistor as long as said holding current is applied.

2. The invention as defined in claim 1 when said power handling switch means is a Triac.

3. The invention as defined in claim 2 wherein said firing circuit means comprises a transistor having a control circuit and said means for establishing a first voltage level is a resistive voltage divider bias circuit connected to the control circuit of the transistor.

4. The invention as defined in claim 3 wherein the programmable unijunction transistor is turned off at the pulsating voltage zero crossover to allow said firing circuit means to turn on providing a triggering signal to said Triac, the first voltage level then established by the conduction of said firing circuit means being of sufficient magnitude to delay the firing again of said unijunction transistor until the pulsating voltage is at least 30° into the next pulsation.

5. In a control circuit for controlling an applied alternating current flow through thyristor means in response to a condition, a circuit comprising:

bidirectional thyristor means having a current carrying circuit connecting load means to an applied alternating current and having a control circuit;

a first transistor having an output circuit and a biasing circuit normaly biasing the transistor to conduction the transistor having a transformer coupling its output circuit to said thyristor control circuit in controlling relation thereto;

said biasing circuit establishing thereon a voltage reference level;

a programmable unijunction transistor having an anode, a cathode and a gate, said gate being connected to said biasing circuit voltage reference level so that the biasing circuit is shorted out and the first transistor is turned off whenever the programmable unijunction transistor is conductive, the anode-cathode circuit being energized from the ripple voltage of an unfiltered rectified alternating current, said ripple voltage causing the programmable unijunction transistor to ignite with each ripple when the voltage at the anode exceeds said voltage reference level and extinguish with each ripple minimum;

voltage divider means connected to apply a holding current to said anode-cathode circuit sufficient to override said ripple voltage minimum and prevent the extinguishing of said programmable unijunction transistor;

and further transistor circuit means including a condition sensing circuit providing an output voltage for controllably disabling the applying of said holding current to said anode-cathode circuit, the further transistor circuit means including a relaxation oscillator providing a sawtooth voltage output, and a condition sensing circuit including a condition responsive resistor in a voltage divider network, the further transistor means further including a voltage comparator providing a first output when the condition sensing output voltage exceeds the sawtooth voltage output, and providing a second output when the sawtooth voltage exceeds the condition sensing output voltage.

References Cited
UNITED STATES PATENTS

| | | | |
|---|---|---|---|
| 3,381,226 | 4/1968 | Jones et al. | 307—252 UA |
| 3,506,852 | 4/1970 | De Hart | 307—252 UA |
| 3,633,094 | 1/1972 | Clements | 307—252 UA |

JOHN ZAZWORSKY, Primary Examiner

U.S. Cl. X.R.

307—252 F, 252 UA